Oct. 8, 1935.  S. T. STRANG ET AL  2,016,935
CORD RETRIEVER
Filed Oct. 31, 1934
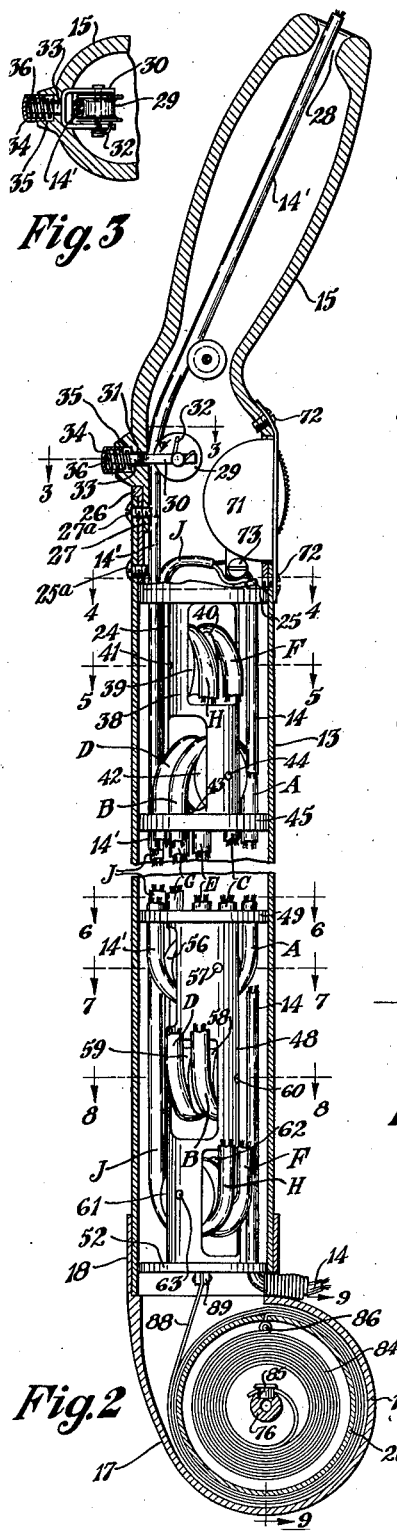
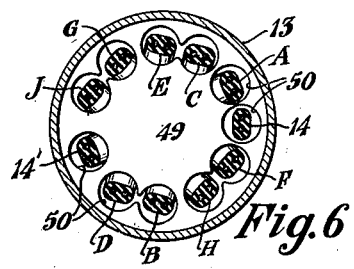
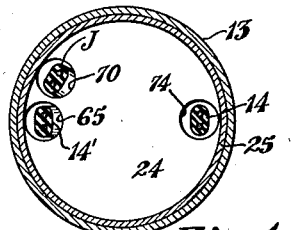
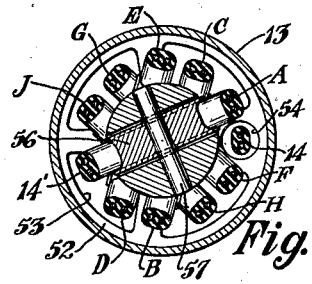
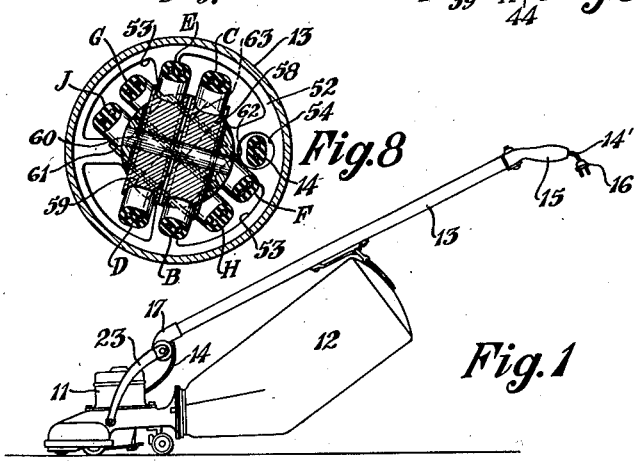
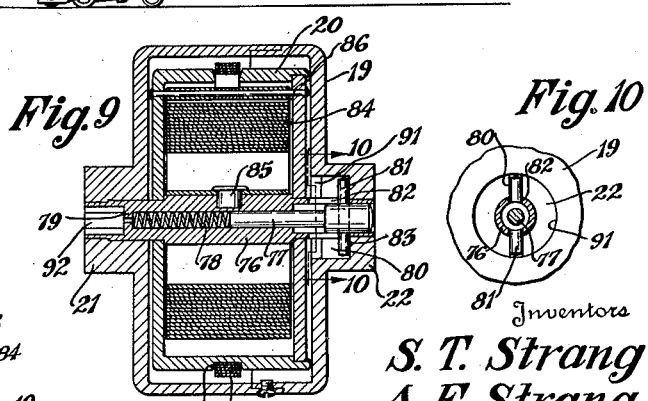
Inventors
S. T. Strang
A. E. Strang
By Trease and Bishop
Attorneys Patented Oct. 8, 1935

2,016,935

UNITED STATES PATENT OFFICE 2,016,935

CORD RETRIEVER

Stephen T. Strang and Alvin E. Strang,
Canton, Ohio

Application October 31, 1934, Serial No. 750,859

4 Claims. (Cl. 242—107)

The invention relates to spring take-ups for conductor cord in portable electrical apparatus, such as suction cleaners and the like.

More particularly, the invention relates to take-ups or retrievers adapted for normally housing a considerable length of conductor cord in a small space.

The present retriever is of a type which does not require sliding contacts for the electrical conductor cord, nor winding of the same on a reel as the cord is taken up. This type of conductor cord retriever is disclosed and described in Patent No. 1,936,463, to S. T. Strang, dated November 21, 1933; and the present invention constitutes improvements thereon.

In the construction shown in said Patent No. 1,936,463, all the pulleys in each pulley block are mounted on the same shaft which is positioned transversely of the cylindrical handle housing the pulleys, and the pulleys are of varying diameters to conform to the cylindrical cross section of the handle.

We have found that by mounting the pulleys in each pulley block on a plurality of longitudinally spaced transversely arranged shafts angularly disposed to each other, all the pulleys may be made substantially equal in diameter and of maximum diameter.

Accordingly, it is an object of the present invention to provide an improved spring-driven retriever for the conductor cord of an electrical apparatus, which retriever is adapted to house the cord in a minimum amount of space.

Another object is to provide a retriever for an electrical conductor cord, which does not require sliding contacts or the winding of the cord on a reel.

Another object is to provide an improved cord retriever adapted to be housed in a cylindrical handle and having a pulley arrangement which pays out or takes up the cord with maximum facility.

A further object is to provide an improved cord retriever adapted for being housed in a cylindrical handle and having a pulley arrangement which subjects the cord to a minimum amount of wear.

A still further object is to provide an improved conductor cord retriever which is adapted to be housed in the usual cylindrical handle of a suction cleaner without materially increasing the size or impairing the appearance thereof.

These and other objects are accomplished by the improvements comprising the present invention, which is disclosed and described in the drawing and specification herein, and which is particularly set forth in the appended claims.

In the drawing forming part hereof

Figure 1 is an elevation of a suction cleaner embodying my improved cord retriever in the handle thereof;

Fig. 2 is a fragmentary longitudinal sectional view of the tubular handle, showing the arrangement of pulleys therein;

Fig. 3 is a fragmentary sectional view taken on line 3—3, Fig. 2, showing the conductor cord clamping means;

Fig. 4 is an enlarged cross sectional view taken on line 4—4, Fig. 2;

Fig. 5 is an enlarged cross sectional view taken on line 5—5, Fig. 2;

Fig. 6 is an enlarged cross sectional view taken on line 6—6, Fig. 2;

Fig. 7 is an enlarged cross sectional view taken on line 7—7, Fig. 2;

Fig. 8 is an enlarged cross sectional view taken on line 8—8, Fig. 2;

Fig. 9 is an enlarged sectional view showing the improved reel, taken on line 9—9, Fig. 2; and Fig. 10 is a fragmentary sectional view as on line 10—10, Fig. 9.

Similar numerals refer to similar parts throughout the several views of the drawing.

While we have shown and described our improved cord retriever as applied to an electric suction cleaner, it will be understood that it may be adapted for use in connection with any portable electrical apparatus, such as an electric iron or a portable electric lamp, without departing from the scope of our invention as defined in the appended claims.

In Fig. 1 is shown an ordinary electric suction cleaner having the motor 11, bag 12, and the tubular handle member 13, which may be and preferably is cylindrical.

The conductor cord 14 is connected at one end to the motor 11, as shown, and is led therefrom into the lower end of the tubular handle member 13, the other end portion 14' of the cord emerging from a hand grip 15 at the top of the handle member 13, and having the usual attaching plug 16 thereon for connection with a power supply socket.

The tubular handle member 13 has at its lower end a reel mounting portion 17, which is provided with a cylindrical socket 18 for receiving the lower end of the handle member 13. The reel mounting portion 17 is provided with a transverse cylindrical portion 19 in which a spring-driven reel 20 is journalled in a manner to be hereinafter described in detail.

At opposite sides of the transverse cylindrical portion 19 of the reel mounting member 17, bosses 21 and 22 are provided coaxial with said portion 19, and said bosses are adapted for connection with the handle bracket 23 of the suction cleaner, as indicated in Fig. 1.

In the upper end of the tubular handle 13, a stationary pulley block 24 is secured. The block 24 is preferably provided with a cylindrical portion 25 fitting within the handle 13 and secured thereto by screws 25a and the like, and having a shoulder 26 abutting the upper end of the tube.

The hand grip 15 is preferably hollow and provided at its inner end with a reduced cylindrical portion 27 which is secured within the cylindrical porton 25 as by screws 27a and the like. Preferably, the outer end of the hand grip 15 is provided with an aperture 28 through which the portion 14' of the conductor cord passes.

Means for normally clamping the conductor cord 14' against longitudinal movement from the aperture 28 inwardly while permitting longitudinal movement thereof outwardly, may include a pulley 29 eccentrically journalled on a yoke 30, which is slidably positioned in a slot 31 in the wall of the hand grip 15. The cord 14' passes between the pulley 29 and the inner wall of the hand grip 15, as shown in Figs. 2 and 3, and a spring 32, having one end connected to the pulley and the other end to the yoke, normally tends to rotate the pulley 29 on its eccentric mounting in a counter-clockwise direction for clamping the cord between the pulley and the wall, against longitudinal movement inwardly.

The yoke 30 is provided with a pin 33 which extends through the wall of the hand grip, and the outer end of the pin 33 has a button or cap 34 secured thereon which is slidable in a socket 35 registering with slot 31. A spring 36 is positioned around the pin 33 between the cap 34 and the bottom wall of socket 35, and the spring normally urges the yoke 30 outwardly against the wall of the hand grip to clamp the cord 14' between the pulley 29 and said wall, as shown in Figs. 2 and 3. By pressing the button 34 inwardly to move pulley 29 away from the wall of the hand grip, the cord 14' is permitted to move longitudinally inward over the pulley.

The stationary pulley block 24 is provided with a reduced extension 38 preferably coaxial therewith, in which a plurality of conductor cord pulleys are journalled. As shown, four pulleys may be journalled in the extension 38, pulleys 39 and 40 being journalled on transverse shaft 41 secured in extension 38, and pulleys 42 and 43 being journalled on transverse shaft 44 secured in extension 38, and longitudinally spaced below the shaft 41. The shafts 41 and 44 are angularly disposed to each other as best shown in Fig. 5, for a purpose to be hereinafter described.

At the lower end of extension 38, a transverse guide flange 45 is preferably provided, and flange 45 may have a series of cord guide holes circumferentially arranged therein, as indicated at 46 in Fig. 5, through which the conductor cord strands from the pulleys pass.

A movable pulley block 48 is slidably mounted in the handle member 13 below the stationary block 24, and has at its upper portion a transverse guide flange 49 provided with circumferentially arranged cord guide holes 50, as shown in Fig. 6. The guide holes 50 cooperate with guide holes 46 to maintain the conductor cord strands in proper position.

A transverse guide flange 52 is mounted on the lower end of movable block 48, and is provided with weight reducing apertures 53, and a single cord guide hole 54, as shown in Figs. 7 and 8. The end portion 14 of the conductor cord leading to the motor 11 passes through cord guide hole 54 and out through an aperture in the reel mounting portion 17.

The transverse guide flanges 49 and 52 are adapted to maintain a close sliding fit with the inside of handle member 13, so as to maintain the movable block 48 in coaxial position therewith, while permitting longitudinal sliding movement of the block 48 in the handle member 13.

A plurality of pulleys are journalled in the reduced portion of movable pulley block 48 between transverse guide flanges 49 and 52, for cooperating with the pulleys in stationary pulley block 24. As shown, five pulleys are journalled in block 48, pulley 56 being journalled on transverse shaft 57 secured in block 48, pulleys 58 and 59 being journalled on transverse shaft 60 secured in block 48 and longitudinally spaced below shaft 57, and pulleys 61 and 62 being journalled on transverse shaft 63 secured in block 48 and longitudinally spaced below shaft 60.

The transverse pulley shafts 57, 60 and 63 are all angularly disposed to each other and also angularly disposed to transverse pulley shafts 41 and 44 in the stationary pulley block 24, so that the conductor cord strands passing over the pulleys journalled on the pulley shafts are circumferentially arranged in the handle member 13 in such a manner as to pass through the cord guide holes in the guide flanges 45, 49 and 52, and so that no two of the conductor cord strands overlap. Thus the various strands of the conductor cord are operatively housed in a minimum amount of space.

The conductor cord 14' entering the hand grip 15 and passing over the clamping pulley 29, is wound successively around the several pulleys alternately from one pulley block to the other, thence passes to and is electrically connected in circuit with a switch located in the hand grip, and thence passes down through the handle member 13 and out through the reel mounting portion thereof for connection to the motor 11.

Beginning at the clamping pulley 29, the cord 14' passes through a cord guide hole 65 in the cylindrical portion 25 of stationary block 24, as shown in Fig. 4. The portion 14' of the cord then passes downward through a cord guide hole in guide flange 45 (Fig. 5), thence through a similar guide hole in guide flange 49 of the movable block 48 (Fig. 6), and thence around pulley 56.

From pulley 56 the conductor cord passes upward as indicated at A through guide holes in flanges 49 and 45 respectively, and thence around pulley 42. From pulley 42 the conductor cord passes downwardly as indicated at B through cord guide holes in flanges 45 and 49 respectively and around pulley 58, thence upward as indicated at C around pulley 43, thence downward as indicated at D and around pulley 59, thence upward as indicated at E and around pulley 40, thence downward as indicated at F and around pulley 62, thence upward as indicated at G and around pulley 39, thence downward as indicated at H and around pulley 61, and thence upward as indicated at J through guide holes in flanges 49 and 45 respectively and guide hole 70 in the upper cylindrical portion 25 of stationary pulley block 24.

From cord guide hole 70 the conductor cord strand J passes over to an ordinary hand operated switch 71 which is mounted in the cylindrical portion 27 of the hand grip as by screws 72, being connected in circuit with the switch as at 73, and thence passes downward as indicated at 14 through the cord guide hole 74 in the cylindrical portion 25 of stationary block 24, thence through cord guide holes in guide flanges 45 and 49 respectively, and then through cord guide hole 75

54 and out through portion 17 of the handle for connection to the motor.

Means for imposing a tension upon the movable pulley block 48 preferably includes the spring-driven reel 20, which is journalled in the cylindrical housing 19 of the reel mounting portion 17 of the handle. The reel 20 is preferably journalled upon a shaft 76 which is mounted at its ends in the bosses 21 and 22 as shown. The shaft 76 has a plunger 77 slidably mounted in its longitudinally central bore, and a coil spring 78 is positioned in the bore between the end of the plunger 77 and a shoulder 79 in the shaft for normally urging the pin outwardly toward and through the boss 22. The boss 22 is provided with a laterally extending slot 80, and a transverse pin 81 secured in the plunger 77 extends through a slot 82 in the shaft 76 and is normally entered in the slot 80 and forced against the end 83 thereof by the spring 78.

A reel-driving coil spring 84 is located within the reel 20 and has one end secured to the shaft 76, as by rivet 85, and the other end connected to a rivet pin 86 which passes through and is secured in the side walls of the reel 20.

Means for connecting the reel 20 to the movable pulley block 48 may comprise a cable or flat flexible steel band, as indicated at 88, which is adapted to be wound around the periphery of the reel. As shown in the drawing, the band 88 has one end connected to the block 48 as by a rivet 89, and the other end passes through a slot in the reel and is connected to the rivet pin 86, the band 88 being wound around the reel in a groove 90.

When the improved cord retriever is assembled in the handle member 13, in order to impose an initial tension upon the reel, the plunger 77 is forced inwardly by means of a suitable tool until the pin 81 is moved out of slot 80 and is free to rotate in the cylindrical portion 91 within the boss 22. A hexagonal wrench may then be inserted in the hexagonal socket 92 at the other end of the shaft, and the shaft turned to impose the desired initial tension upon the reel, after which the plunger is released to allow pin 81 to enter slot 80 and lock the shaft 76 in the housing 19.

The conductor cord 14', which is connected at its end to the power supply socket, may be paid out to any length to allow the suction cleaner to be operated at a desired distance from the socket, the movable pulley block 48 moving upwardly in the handle member 13 against the tension of the spring 84 in the reel 20, and the clamping pulley 29 clamping the cord against movement inwardly. When it is desired to take up the excess cord into the handle, it is only necessary to press the clamping button 34, to release pulley 29 and the tension of the spring 84 will pull down the movable pulley block 48 and draw the excess length of conductor cord into the handle 13.

By journalling the pulleys upon transversely disposed shafts which are angularly disposed to each other, according to the present invention, none of the various strands of the conductor cord overlap, with the result that all of the space within the handle is utilized and the pulleys may be made substantially equal in diameter and of maximum diameter. In other words, the diameter of each pulley plus the thickness at each side thereof of the conductor cord which passes thereover may be substantially equal to the inside diameter of the handle member 13.

Accordingly, all of the pulleys are of sufficient size to insure that the cord will pass freely and easily thereover without kinking and without being subjected to any material amount of wear.

The present improved cord retriever does not require sliding contacts nor the winding of the conductor cord on a reel, and is adapted for being housed in the usual cylindrical handle of a suction cleaner without materially increasing the size or impairing the appearance thereof.

We claim:

1. A cord retriever for electrical apparatus having a tubular member and a conductor cord extending therethrough, including a stationary pulley block fixed in the tubular member, a movable pulley block slidably mounted in the tubular member, each pulley block having a plurality of longitudinally spaced transversely arranged shafts angularly disposed to each other, pulleys journalled on each of said shafts, the conductor cord being wound successively around the pulleys alternately from one pulley block to the other, and means for imposing a tension on the movable pulley block.

2. A cord retriever for electrical apparatus having a tubular member and a conductor cord extending therethrough, including a stationary pulley block fixed in the tubular member, a movable pulley block slidably mounted in the tubular member, each pulley block having a plurality of longitudinally spaced transversely arranged shafts angularly disposed to each other, pulleys journalled on each of said shafts, the conductor cord being wound successively around the pulleys alternately from one pulley block to the other, a spring-driven reel journalled in the tubular member, and means operatively connecting the reel with the movable pulley block.

3. A cord retriever for electrical apparatus having a tubular member and a conductor cord extending therethrough, including a stationary pulley block fixed in the tubular member, a movable pulley block slidably mounted in the tubular member, each pulley block having a plurality of longitudinally spaced transversely arranged shafts angularly disposed to each other, pulleys journalled on each of said shafts, the conductor cord being wound successively around the pulleys alternately from one pulley block to the other, the diameter of each pulley plus the thickness at each side thereof of the cord passing thereover being substantially equal to the inside diameter of the tubular member, and means for imposing a tension on the movable pulley block.

4. A cord retriever for electrical apparatus having a tubular member and a conductor cord extending therethrough, including a stationary block fixed in the tubular member, a movable block slidable in the tubular member, each block having a plurality of transversely disposed pulleys journalled therein in longitudinally spaced angular relation to each other, the conductor cord being wound successively around the pulleys alternately from one pulley block to the other, one end of the cord being connected to the electrical apparatus and the other end being adapted for connection to the power supply, and means for imposing a tension on the movable pulley block.

STEPHEN T. STRANG.
ALVIN E. STRANG.